United States Patent [19]

Ekstrom et al.

[11] 4,024,454
[45] May 17, 1977

[54] HOLDING CIRCUIT FOR STATIC CONVERTOR VALVES

[75] Inventors: Ake Ekstrom; Lars-Erik Juhlin, both of Ludvika, Sweden

[73] Assignee: ASEA Aktiebolag, Vasteras, Sweden

[22] Filed: Jan. 26, 1976

[21] Appl. No.: 652,525

[30] Foreign Application Priority Data

Mar. 6, 1975 Sweden .............................. 7502478

[52] U.S. Cl. .................................... 321/12; 321/5; 321/47
[51] Int. Cl.² ......................................... H02M 1/18
[58] Field of Search ....... 307/252 L, 252 P, 252 Q; 321/5, 27 R, 47, 11–12

[56] References Cited

UNITED STATES PATENTS

| 2,532,107 | 11/1950 | Lamm | 321/11 |
|---|---|---|---|
| 3,421,023 | 1/1969 | Fry | 307/252 Q |
| 3,462,619 | 8/1969 | Grees et al. | 307/252 Q |
| 3,470,450 | 9/1969 | Eriksson et al. | 321/16 |
| 3,644,753 | 2/1972 | Ginsberg | 307/252 Q |
| 3,670,236 | 6/1972 | Ekstrom | 321/27 R |

Primary Examiner—William M. Shoop
Attorney, Agent, or Firm—Watson, Cole, Grindle & Watson

[57] ABSTRACT

In a static convertor which comprises at least one rectifier bridge with valves or rectifiers arranged in commutating groups and a control pulse emitter connected to the valves by individual control circuits, in order to ensure that during operation one valve in each group always receives an ignition signal, a holding circuit is provided for each valve and its control circuit and a signal output for indicating valve ignition. The holding circuit is connected on its input side to the signal outputs for the valves in the proper commutating group in such a way that the holding circuit is switched on by the signal outputs of its own valves and switched off by the signals from the signal outputs of the other valves.

6 Claims, 3 Drawing Figures

HOLDING CIRCUIT FOR STATIC CONVERTOR VALVES

BACKGROUND OF THE INVENTION

1. Field of the Invention

The present invention relates to a static convertor.

2. The Prior Art

In the event of a rectifier or valve failure in a static convertor, for example when a rectifier or valve does not ignite, the resultant disturbance may give rise to overvoltages and overtones of such a nature that all the rectifiers in a commutating group are blocked, which means that the DC side of the convertor is completely interrupted. The overvoltage thus produced involves a great risk that one or more rectifiers may be destroyed, particularly in large plants, for example power transmissions for high-voltage direct current.

SUMMARY OF THE INVENTION

In order to avoid the drawback mentioned above, there is proposed, according to the invention, a device by which it is ensured that one of the rectifiers in each commutating group always has an ignition pulse independent of any other disturbances, and the converter is therefore always able to conduct the direct current.

More specifically, in a static convertor which comprises at least one rectifier bridge with valves arranged in commutating groups and a common control pulse emitter for the valves connected to them by individual control circuits, means is provided to ensure that during operation one valve in each commutating group always receives an ignition signal. Such means comprises a holding circuit for the control circuit of the valve having a signal output for indicating valve ignition. The holding circuit includes a bi-stable flip-flop, the output of which is connected to the input of the control circuit of the valve parallel to the control pulse emitter by an Or-gate. One input of the flip-flop is connected to the signal output from the proper valve for setting flip-flop to One, while the other input of the flip-flop is connected by the Or-gate to the signal output of the other valves of the commutating groups for setting the flip-flop to Zero when any of these other valves ignite.

BRIEF DESCRIPTION OF THE DRAWINGS

In other respects the invention will be described in more detail with reference to the accompanying drawings, in which.

DESCRIPTION OF THE PREFERRED EMBODIMENTS

Figure 1:
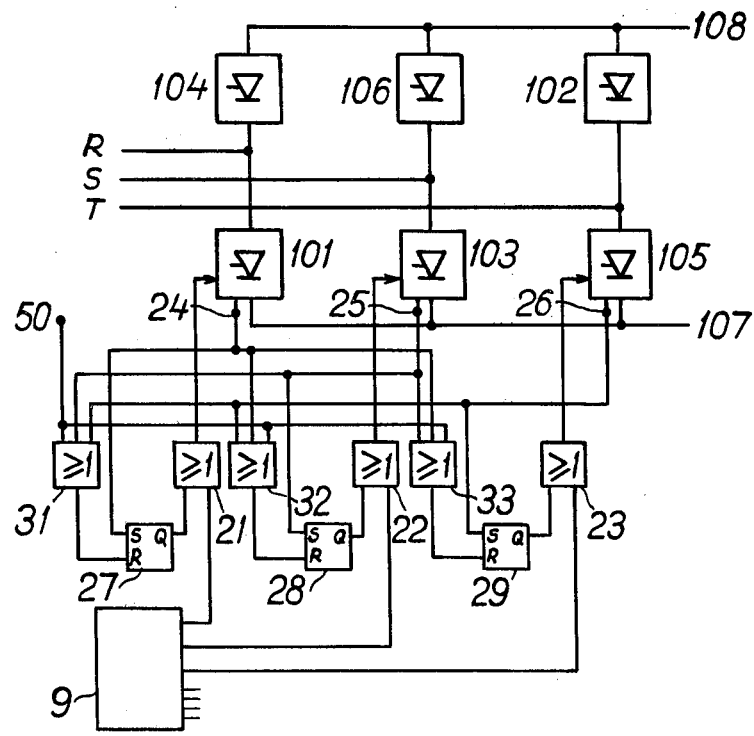
FIG. 1 shows a convertor with a device according to the invention, FIG. 2 showing a variant of a detail of the device.

FIG. 1 shows a rectifier bridge 101–106 for a convertor with AC connections RST and DC connections 107, 108. The rectifiers are divided into two commutating groups 101,103,105 and 102,104,106, but a control system and a mechanism according to the invention have only been illustrated for the lower group. From a control pulse generator 9 the rectifiers are fed with control pulses over the Or-gates 21,22,23. From the special outputs 24,25,26 on the rectifiers there are obtained signals indicating that the relevant thyristor has ignited or at least that an ignition signal is connected to its control electrode from the control pulse generator 9, as will be described in more detail with reference to FIG. 3.

The outputs 24,25,26 are connected to flip-flops 27,28,29 in such a way that, for each valve, said output is connected directly to the on-input of the flip-flop which belongs to the proper valve, whereas the output over the Or-gates 31,32,33 is connected to the off-input of the flip-flop for the other two valves.

In this way an output signal 24,25,26 from a valve will cause the corresponding flip-flop 27,28 and 29, respectively, to be switched on so that the valve and its control circuit acquire a holding circuit over this flip-flop and the corresponding Or-gate 21,22 and 23, respectively. At the same time, the flip-flops for the other two valves receive an off-signal over the corresponding Or-gates 31,32,33.

This means that, if the control pulse output from 9 changes from valve 105 to valve 101 and the control pulse to this latter valve for some reason does not pass through so that valve 101 does not ignite, then valve 105 will continue to conduct because of the holding circuit over 29,23 until one of the valves 101 or 103 receives an ignition signal and thus emits an output signal over 24 or 25, respectively, thus switching off the flip-flop 29 by way of the Or-gate 33.

Since similar devices are present for the valves 102,104,106 in the other commutating group, the rectifier bridge will therefore always be conducting despite any disturbances in the control circuits. Such disturbances may give cause to other drawbacks which may require other measures, but the valves are secured against overvoltages from the DC side, which could otherwise destroy the valves.

Figure 2:
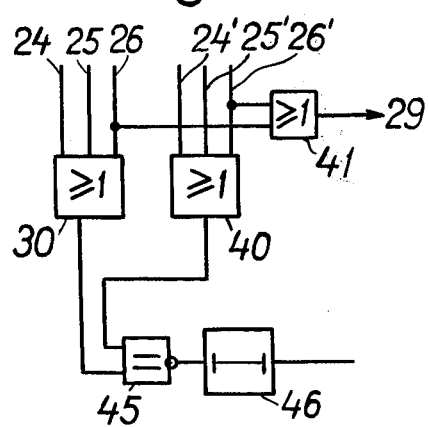

The valves 101–106 with their control circuits are arranged at a high potential, whereas the circuits 21–23 and 27–33 usually are at low potential, and therefore the transmission by way of the outputs 24–26 must be made over a high potential difference, for example by light pulses. To ensure this transmission it is therefore suitable to double the outputs, for example as shown in FIG. 2 which has double outputs 24–26 and 24'–26'. The connection of 26 and 26' to the flip-flop 29 then takes place over Or-gate 41, and similar Or-gates are present for the other two valves.

In order to ensure that both the transmissions are intact for all three valves, the transmissions 24–26 and 24'–26' are collected in Or-gates 30 and 40, respectively, connected to an equality gate 45 with a negative output. This means that if, at some time, 45 receives a signal on one input only, a signal will be supplied to a warning device 46 which indicates that one of the transmissions 24–26 or 24'–26' is out of operation. To secure correct operation, however, the signals from 24–26 and 24'–26' should be in the form of short pulses.

Whereas, for connection to flip-flops 27–29, Or-gates corresponding to 41 must be available for all the three valves, the double transmissions may be connected directly to the Or-gates 31–33 for disconnecting the flip-flops.

Figure 3:
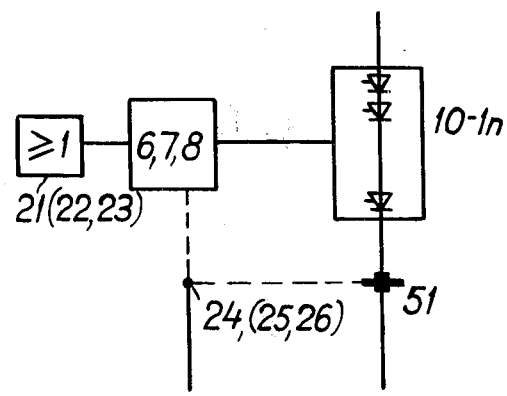
FIG. 3 shows a rectifier with control circuits.

FIG. 3 shows how a valve with control circuits may be designed according to U.S. Pat. No. 3,878,448. According to FIG. 1 in that patent, the valve then consists of a number of series-connected thyristors 10-1n, which receive their control pulses over the compounds 6,7,8 shown therein, and, as the signal outputs 24–26 according to the present description, FIG. 1, the output from any one of said components 6,7 or 8 according to said patent may be used. By choosing the output from 8, a control of the whole signal path to the light conductors 23 is obtained. The Or-gate 20 according to said patent suitably corresponds to the Or-gates 21–23 according to FIG. 1 of the present description.

By arranging the signal path to the outputs 24–26 as described in said patent, a control is obtained which assures that the valve has positive voltage in the conducting direction and that control pulses are fed to the control device of the valve, which means that the valve is certain to ignite. The most important obstacle for providing ignition is that one or more thyristors completely refuse to ignite, which, however, normally results in these being short-circuited and destroyed by the overvoltage to which they are exposed when the other thyristors are ignited. This is, however, normally anticipated by selecting a sufficient number of thyristors.

If it is preferred to have a direct control to determine whether the valve has really ignited and become current-carrying, this can be done by indicating the current in the valve by means of, for example, a transductor 51 in series with the valve. The connections — shown by broken lines — to the out-put 24 (25,26) in FIG. 3 indicate that the output signal is obtained either from the transductor 51 or from any of the components 6, 7,8.

FIG. 1 shows that the device according to the invention makes possible a simple blocking of the convertor by connecting a blocking signal across the input 50 to the Or-gates 31–33.

We claim:

1. In a static convertor which comprises at least one rectifier bridge with valves or rectifiers (101–106) arranged in commutating groups (101,103, 105 and 102,104,106, respectively), a common control pulse emitter (9) for the valves, individual control circuits (6–8) connecting the common control pulse emitter to the valves, means to ensure that during operation one valve in each commutating group always receives an ignition signal, said means for each valve comprising a holding circuit (27–29, 21–23) for the control circuit of the valve and one signal output (24–26) for indicating valve ignition, which holding circuit is connected on its input side (27–29) to said signal outputs (24–26) for the valves in the proper commutating group in such a way that the holding circuit is switched on by the signal from the signal output of its own valve and switched off by the signals from the signal outputs of the other valves.

2. In a convertor according to claim 1, said holding circuit comprising a bistable flip-flop (27–29), an Or-gate (21–23) connecting the output of said flip-flop to the input (6) on the control circuit (6–8) of the valve (101–106) parallel to said control pulse emitter (9), one input of the flip-flop being connected to said signal output (24–26) from the proper valve for setting the flip-flop to One, the other input of the flip-flop being connected by way of an Or-gate (31–33) to the signal output from the other valves in the commutating group for setting flip-flop to Zero when any of these other valves ignite.

3. In a convertor according to claim 1, the connection of said signal outputs (24–26) to the inputs (27–29) of the holding circuits (27–29, 21–23) comprising double parallel connections (24–26, 24'–26').

4. In a convertor according to claim 3, said parallel connections (24–26, 24'–26') being connected to a signal device (45,46) which emits a signal if no signal appears on both the parallel connections simultaneously.

5. In a convertor according to claim 1, said signal output (24–26) being connected to control circuits (6–8) of the valve to indicate that the valve receives an ignition pulse and is ready to ignite.

6. In a convertor according to claim 1, said signal output (24–26) for a valve comprising a current indicator (51) for the valve.

* * * * *